United States Patent
Spira

(10) Patent No.: US 11,140,756 B2
(45) Date of Patent: Oct. 5, 2021

(54) WALL-MOUNTABLE WIRELESS REMOTE CONTROL DEVICE

(71) Applicant: Lutron Technology Company LLC, Coopersburg, PA (US)

(72) Inventor: Joel S. Spira, Coopersburg, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 16/901,827

(22) Filed: Jun. 15, 2020

(65) Prior Publication Data

US 2021/0022227 A1 Jan. 21, 2021

Related U.S. Application Data

(63) Continuation of application No. 16/180,698, filed on Nov. 5, 2018, now Pat. No. 10,687,405, which is a continuation of application No. 15/594,100, filed on May 12, 2017, now Pat. No. 10,123,400, which is a continuation of application No. 14/580,353, filed on Dec. 23, 2014, now Pat. No. 9,699,870.

(Continued)

(51) Int. Cl.
| | |
|---|---|
| *H05B 45/10* | (2020.01) |
| *H05B 47/19* | (2020.01) |
| *H05B 47/115* | (2020.01) |
| *H05B 47/195* | (2020.01) |

(52) U.S. Cl.
CPC ........... *H05B 45/10* (2020.01); *H05B 47/115* (2020.01); *H05B 47/19* (2020.01); *H05B 47/195* (2020.01)

(58) Field of Classification Search
CPC ...... H05B 45/10; H05B 47/115; H05B 47/19; H05B 47/195
See application file for complete search history.

(56) References Cited

U.S. PATENT DOCUMENTS

| 4,783,581 A | 11/1988 | Flowers et al. |
| 4,864,588 A | 9/1989 | Simpson et al. |

(Continued)

FOREIGN PATENT DOCUMENTS

CN 2596671 Y 12/2003

OTHER PUBLICATIONS

Lutron, "Hybrid Keypads", RadioRA 2 Product Specifications, 369-228c, Aug. 31, 2010, pp. 1-6.

*Primary Examiner* — Robert L Deberadinis
(74) *Attorney, Agent, or Firm* — Glen Farbanish; Philip Smith; Michael Czarnecki

(57) ABSTRACT

A wall-mountable remote control device may be installed in place of an existing light switch and may be configured to transmit wireless signals to an electrical load device, such as a screw-in light-emitting diode (LED) lamp, to provide control of the electrical load device. The remote control device may comprise an air-gap switch adapted to be electrically coupled in series between a power source and the controllable light source, but may not comprise a bidirectional semiconductor switch for controlling the amount of power delivered to the electrical load device using a phase-control dimming technique. The remote control device may have a low-profile enclosure that is smaller than an enclosure of a standard dimmer switch, and thus may be easier to install in an electrical wallbox. The remote control device may comprise two parts including an air-gap switch device and a wireless communication device mounted to the air-gap switch device.

18 Claims, 8 Drawing Sheets

Related U.S. Application Data

(60) Provisional application No. 62/095,304, filed on Dec. 22, 2014, provisional application No. 61/921,100, filed on Dec. 27, 2013.

(56) References Cited

U.S. PATENT DOCUMENTS

| | | |
|---|---|---|
| 5,239,205 A | 8/1993 | Hoffman et al. |
| 5,905,442 A | 5/1999 | Mosebrook et al. |
| 5,982,103 A | 11/1999 | Mosebrook et al. |
| 6,545,434 B2 | 4/2003 | Sembhi et al. |
| 6,803,728 B2 | 10/2004 | Balasubramaniam et al. |
| 7,365,282 B2 | 4/2008 | Altonen et al. |
| 7,423,413 B2 | 9/2008 | Dobbins et al. |
| 7,564,227 B2 | 7/2009 | Dobbins et al. |
| 7,573,208 B2 | 8/2009 | Newman, Jr. |
| 7,728,564 B2 | 6/2010 | Fricke et al. |
| 8,068,014 B2 | 11/2011 | Steiner et al. |
| 8,173,920 B2 | 5/2012 | Altonen et al. |
| 8,330,638 B2 | 12/2012 | Altonen et al. |
| 8,389,857 B2 | 3/2013 | Petrillo |
| 8,471,687 B2 | 6/2013 | Steiner et al. |
| 8,598,978 B2 | 12/2013 | Knode et al. |
| 8,796,940 B2 | 8/2014 | Altonen et al. |
| 9,699,870 B2 | 7/2017 | Spira |
| 2008/0111491 A1 | 5/2008 | Spira |
| 2013/0181630 A1 | 7/2013 | Taipale et al. |
| 2013/0214609 A1 | 8/2013 | Carmen, Jr. |
| 2014/0117871 A1 | 5/2014 | Swatsky et al. |
| 2014/0265880 A1 | 9/2014 | Taipale et al. |
| 2015/0228419 A1 | 8/2015 | Fadell et al. |

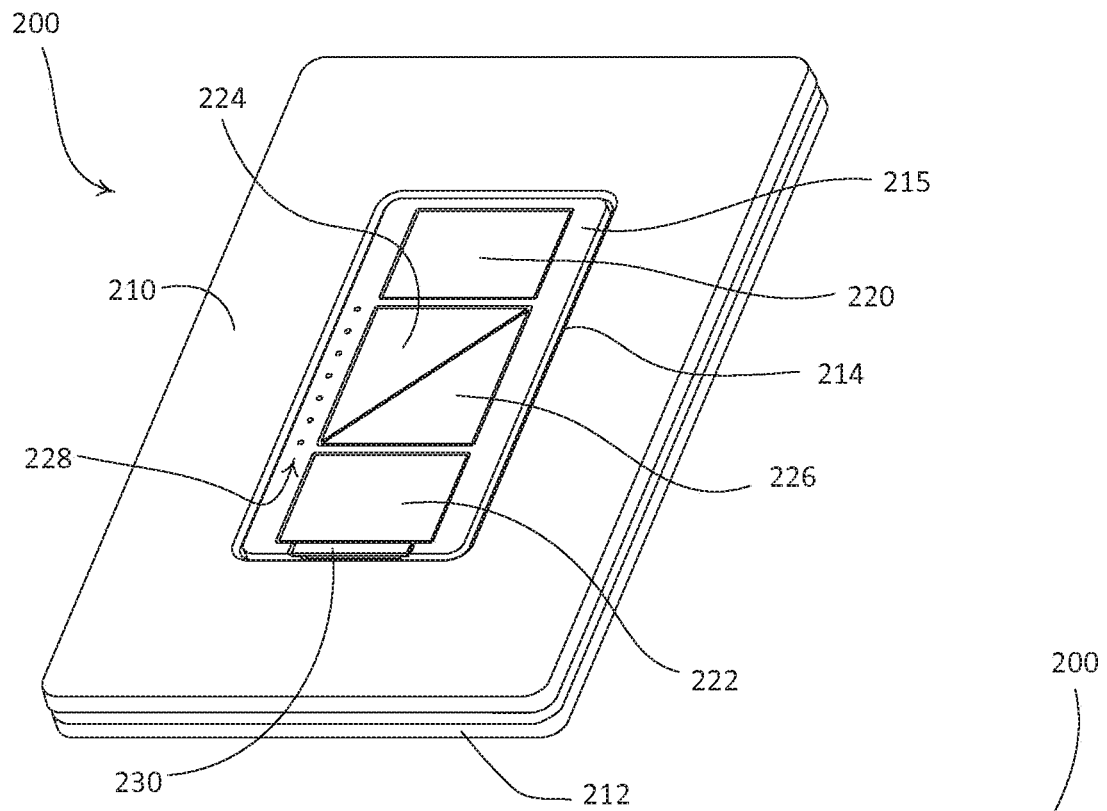
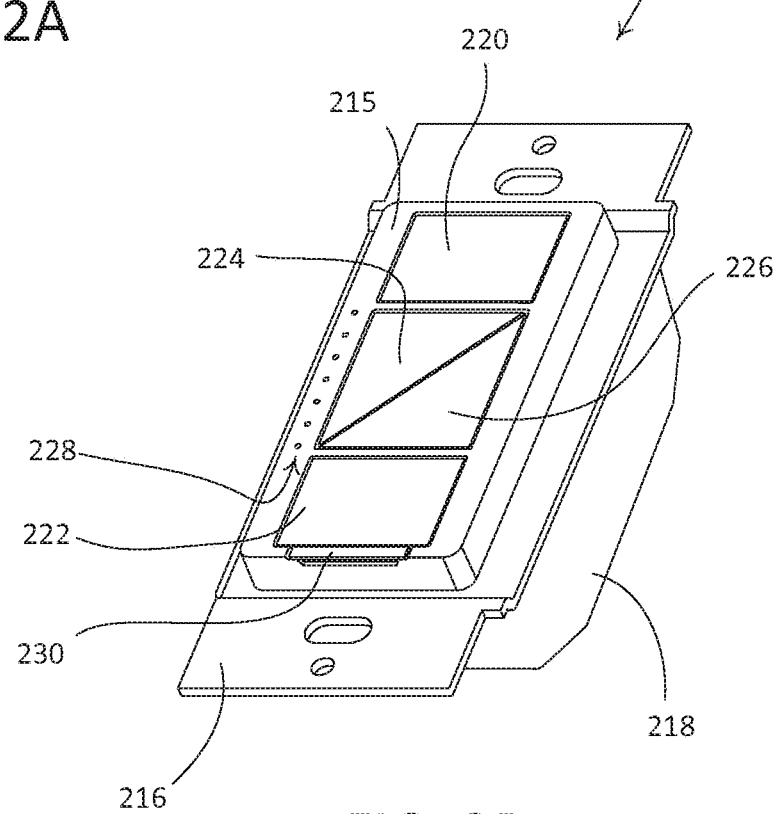
FIG. 2A
FIG. 2B

WALL-MOUNTABLE WIRELESS REMOTE CONTROL DEVICE

CROSS-REFERENCE TO RELATED APPLICATIONS

This application is a continuation of U.S. patent application Ser. No. 16/180,698, filed Nov. 5, 2018, now U.S. Pat. No. 10,687,405, issued Jun. 16, 2020, entitled WALL-MOUNTABLE WIRELESS REMOTE CONTROL DEVICE, which is a continuation of U.S. patent application Ser. No. 15/594,100, filed May 12, 2017, now U.S. Pat. No. 10,123,400, issued Nov. 6, 2018, entitled WALL-MOUNTABLE WIRELESS REMOTE CONTROL DEVICE, which is a continuation of U.S. patent application Ser. No. 14/580,353, filed Dec. 23, 2014, now U.S. Pat. No. 9,699,870, issued Jul. 4, 2017, entitled WALL-MOUNTABLE WIRELESS REMOTE CONTROL DEVICE, which claims priority to U.S. Provisional Patent Application No. 61/921,100, filed Dec. 27, 2013, entitled REMOTE CONTROL DEVICE FOR A CONTROLLABLE LIGHT SOURCE, and U.S. Provisional Patent Application No. 62/095,304, filed Dec. 22, 2014, entitled WALL-MOUNTABLE WIRELESS REMOTE CONTROL DEVICE, the respective disclosures of which are incorporated herein by reference in their respective entireties.

BACKGROUND

Field of the Disclosure

The present disclosure relates to a remote control device for an electrical load device, and more particularly, to a remote control device adapted to replace a light switch for controlling an electrical load device, such as a controllable light source or a remotely-located load control device for controlling the amount of power delivered to an electrical load.

Description of the Related Art

In order to reduce energy consumption, the use of high-efficiency light sources (e.g., gas discharge lamps, such as compact fluorescent lamps (CFL) and light-emitting diode (LED) light sources) is increasing, while the use of low-efficiency light sources (e.g., incandescent lamps or halogen lamps) is decreasing. Particularly, many consumers are replacing older screw-in incandescent lamps with screw-in high-efficiency lamps to provide a quick path to reducing energy consumption. A screw-in high-efficiency lamp includes a light source (e.g., a CFL tube or LED light engine) and an integral load regulation circuit (e.g., a ballast circuit or an LED drive circuit) housed in a base of the high-efficiency lamp. The high-efficiency lamp receives an alternating-current (AC) mains voltage from an AC power source and the load regulation circuit regulates at least one of a load voltage generated across the light source and a load current conducted through the light source. In most installations, the screw-in high-efficiency lamp may be turned on and off by actuating a light switch coupled between the AC power source and the high-efficiency lamp. Many screw-in high-efficiency lamps may be dimmed by a dimmer switch that replaces the light switch.

Some screw-in high-efficiency lamps now also include integral wireless receivers, e.g., radio-frequency (RF) receivers, for receiving wireless signals, e.g., RF signals, from a remote control device, such that the screw-in high-efficiency lamp may be turned on and off and dimmed in response to the remote control device. These wirelessly-controlled high-efficiency lamps may still be coupled in series with a previously-installed light switch. If the light switch is turned off (e.g., opened), the high-efficiency lamp will not be powered and thus will not be able to be controlled by the remote control device.

SUMMARY

As described herein, a wall-mountable remote control device may be installed in place of an existing light switch and may be configured to transmit wireless signals to an electrical load device to provide control of the electrical load device. The electrical load device may be a controllable light source, such as a screw-in light-emitting diode (LED) or compact fluorescent (CFL) lamp, or a remotely-controllable control module or load control device, such as an LED driver for an external LED light engine. After installation, the remote control device may be easily associated with the electrical load device, such that the electrical load device is then responsive to the wireless signals transmitted by the remote control device. The remote control device may comprise a user interface having one or more buttons (e.g., actuators) and may transmit the wireless signals to the electrical load device in response to actuations of the buttons. For example, the remote control device may comprise a wireless communication circuit, e.g., a radio-frequency (RF) communication circuit configured to transmit an RF signal, and a control circuit coupled to the actuator and the RF communication circuit. The control circuit may be configured to cause the RF communication circuit to transmit the RF signal in response to an actuation of the at least one actuator, where the RF signal includes a command for controlling the electrical load. The electrical load device may be configured to adjust an amount of power consumed by the electrical load device in response to the RF signal (e.g., solely in response to the RF signal). Since the remote control is a "two-wire" device and does not require a neutral connection, the remote control device provides for control of the electrical load device without requiring any additional wiring. Accordingly, the remote control device avoids the problem of the prior art in which an installed light switch may be operated to remove power from a controllable light source, and instead provides one or more buttons to provide for manual control of the controllable light source.

The remote control device may comprise an air-gap switch adapted to be electrically coupled (e.g., substantially directly electrically coupled) in series between a power source (e.g., an AC power source) and the controllable light source, but may not comprise a bidirectional semiconductor switch (such as a triac or one or more field-effect transistors) for controlling the amount of power delivered to the electrical load device using a phase-control dimming technique (e.g., as in a standard dimmer switch). When the air-gap switch is closed, a load voltage is developed across the controllable light source and is substantially undistorted from the AC line voltage produced by the AC power source. The air-gap switch may be opened to provide an actual air-gap barrier between the power source and the controllable light source to facilitate servicing of the control light source. Since the remote control device does not include a bidirectional semiconductor switch for dimming the electrical load device, an enclosure of the remote control device may be of smaller size than the enclosure of a standard dimmer switch, and thus may be easier to install in an electrical wallbox. The air-gap switch may provide a way of cycling power to the electrical load device to facilitate association of the remote control device and the electrical load device.

The remote control device may also comprise a power supply coupled in series with the air-gap switch for stealing power from a line voltage produced by the power source to generate a supply voltage for powering the wireless communication circuit and the control circuit. Since the remote control device is a two-wire device, the power supply may be configured to conduct a charging current through the electrical load device to generate the supply voltage. When the remote control device comprises a power supply, the remote control device does not require a depletable power source, such as one or more batteries, which may need to be periodically replaced.

A remote control device comprising an air-gap switch device and a wireless communication device for use in a load control system for controlling the amount of power delivered from an AC power source to an electrical load device is also described herein. The air-gap switch device may comprise: (1) a yoke portion configured to be mounted to an electrical wallbox; (2) an enclosure connected to the yoke portion in such a way as to be located inside of the wallbox when the yoke portion is mounted to the wallbox; (3) an air-gap switch located inside of the enclosure and adapted to be electrically coupled in series between the AC power source and the electrical load; and (4) an air-gap switch actuator mechanically coupled to the air-gap switch and configured to be actuated by a user to open and close the air-gap switch. The yoke portion may define a mounting structure that is configured to releasably receive the wireless communication device. The wireless communication device may be located at least partially outside of the wallbox when the yoke portion is mounted to the wallbox and the wireless communication device is received on the mounting structure.

The wireless communication device received on the mounting structure of the air-gap switch device may comprise at least one actuator, a wireless communication circuit configured to transmit a wireless signal, and a control circuit coupled to the actuator and the wireless communication circuit. The control circuit may be configured to cause the wireless communication circuit to transmit the wireless signal in response to an actuation of the at least one actuator, the wireless signal including a command for controlling the electrical load. For example, the wireless communication device may be battery-powered, and may be configured to be removed from the mounting structure after the air-gap switch device is mounted to the wallbox. The control circuit of the wireless communication device may be configured to subsequently cause the wireless communication circuit to transmit the wireless signal in response to an actuation of the at least one actuator when the wireless communication device is removed from the mounting structure. To provide for easy adjustment of the user interface of the remote control device, the wireless communication device may be removed from the mounting structure and replaced with a new wireless communication device having a different number, type, arrangement, or orientation of buttons.

BRIEF DESCRIPTION OF THE DRAWINGS

FIG. 2A is a perspective view of an example remote control device.

FIG. 2B is a perspective view of the remote control device of FIG. 2A with a faceplate removed.

DETAILED DESCRIPTION

Figure 1:
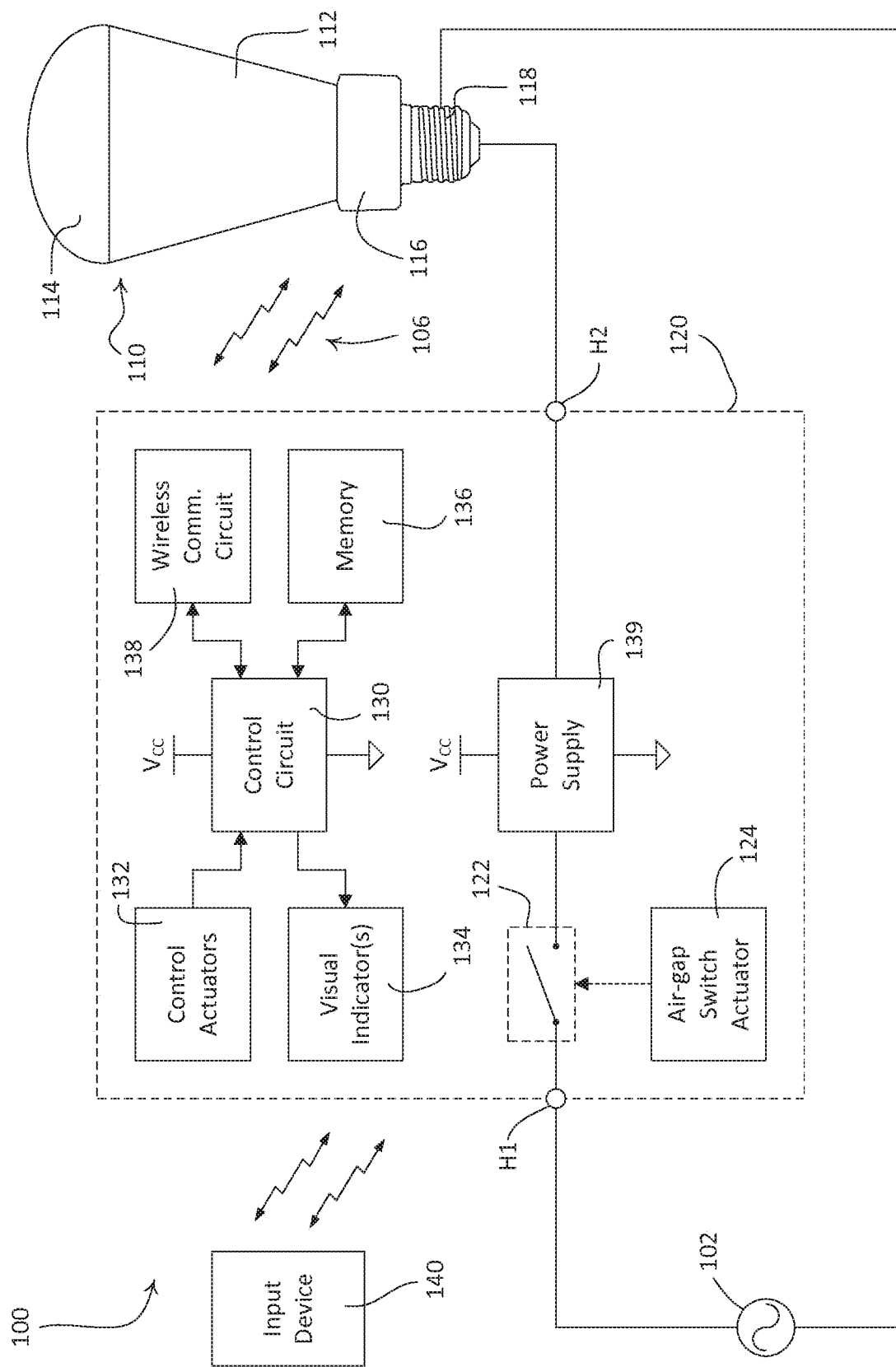
FIG. 1 is a simple diagram of an example load control system having a load control device and a remote control device.

FIG. 1 is a simple diagram of an example load control system 100 (e.g., a lighting control system) having an electrical load device (e.g., a controllable light source 110) and a remote control device 120. For example, the controllable light source 110 may be a screw-in light-emitting diode (LED) or compact fluorescent (CFL) lamp. The controllable light source 110 may replace a previously-installed light bulb installed in, for example, a ceiling-mounted or wall-mounted lighting fixture (such as a downlight fixture or a sconce) or a lamp (such as a table lamp or a floor lamp). The remote control device 120 is adapted to be coupled in series electrical connection between a power source, e.g., an alternating-current (AC) power source 102, and the controllable light source 110. The remote control device 120 may be installed in an electrical wallbox in place of a standard wall-mounted mechanical switch (e.g., a "toggle switch" or a "light switch") that was used to turn the previously-installed light bulb on and off (e.g., in a retrofit installation). The remote control device 120 may be configured to transmit wireless signals, e.g., radio-frequency (RF) signals 106, to the controllable light source 110 for controlling the controllable light source 110.

The controllable light source 110 may comprise a housing 112 (e.g., a glass housing) having a front surface 114 and an integral lighting load (not shown), such as an incandescent lamp, a halogen lamp, a compact fluorescent lamp, a light-emitting diode (LED) light engine, or other suitable light source. The lighting load may be located inside of the housing 112 of the housing and is adapted to shine light out of the front surface 114 and/or the sides of the housing. The controllable light source 110 may alternatively comprise a reflector located around the sides of the housing for directing the illumination from the lighting load out the front surface 114 of the housing 112. The front surface 114 of the controllable light source 110 may be transparent or translucent and may be flat or domed. The controllable light source 110 may also comprise an enclosure portion 116 coupled to a screw-in base 118 that is adapted to be screwed into a standard Edison socket, such that the controllable light source may be coupled to the AC power source 102.

The enclosure portion 116 may house an integral load control circuit (not shown), such as a dimmer circuit, a ballast circuit, or a LED driver circuit, for controlling the intensity of the lighting load between a low-end intensity (e.g., approximately 1%) and a high-end intensity (e.g., approximately 100%). The controllable light source 110 may also comprise a control circuit (e.g., microprocessor) and a wireless receiver (e.g., an RF receiver) housed inside the enclosure portion 116, such that the control circuit is operable to control the lighting load in response to the RF signals 106 received from the remote control device 120. Examples of screw-in luminaires are described in greater detail in commonly-assigned U.S. Pat. No. 8,008,866, issued Aug. 30, 2011, entitled HYBRID LIGHT SOURCE; U.S. Patent Application Publication No. 2012/0286689, published Nov. 15, 2012, entitled DIMMABLE SCREW-IN COMPACT FLUORESCENT LAMP HAVING INTEGRAL ELECTRONIC BALLAST CIRCUIT; and U.S. patent application Ser. No. 13/829,834, filed Mar. 14, 2013, entitled CONTROLLABLE LIGHT SOURCE, the entire disclosures of which are hereby incorporated by reference.

Alternatively, the electrical load device may comprise a load control device for controlling an external electrical load (such as, for example, an LED driver for an external LED light engine), or a motorized window treatment.

The remote control device 120 may be a "two-wire" remote control device and may comprise two load terminals H1, H2 for coupling the remote control device 120 in series electrical connection between the AC power source 102 and the controllable light source 110. As defined herein, a "two-wire" remote control device does not require a direct connection to the neutral side of the AC power source 102. In other words, all currents conducted through the two-wire remote control device are conducted through the electrical load device (e.g., the controllable light source 110). A two-wire remote control device may have only two terminals (i.e., the load terminals H1, H2 as shown in FIG. 1). Alternatively, a two-wire remote control device may comprise one or more additional connections that are not connections to neutral (e.g., to earth ground). Since the remote control device 120 is electrically coupled in series between the AC power source 102 and the controllable light source 110 and mounted to an electrical wallbox, the remote control device may not be easily uninstalled and removed from the load control system 100, which hinders theft if the remote control device is installed in a public space, such as an office or a hotel room.

The remote control device 120 may also comprise a mechanical air-gap switch 122 coupled in series between the load terminals H1, H2. The air-gap switch 122 may be opened and closed in response to actuations of an air-gap switch actuator 124 for respectively disconnecting and connecting the controllable light source 110 with the AC power source 102. For example, the air-gap switch 122 may be opened to disconnect the controllable light source 110 from the AC power source 102, such that the controllable light source 110 may be serviced. The remote control device 120 may be configured to provide a load voltage that is developed across the controllable light source 110 and is substantially undistorted from the AC line voltage produced by the AC power source 102. The remote control device does not include any electronic power-switching components, such as a bidirectional semiconductor switch (e.g., a triac or one or more field-effect transistors), for controlling the amount of power delivered to the controllable light source 110 using a phase-control dimming technique (e.g., as in a standard dimmer switch). The air-gap switch 112 is substantially directly electrically coupled between the AC power source 102 and the controllable light source 110, i.e., the air-gap switch 112 is not electrically coupled in series with a bidirectional semiconductor switch for controlling the amount of power delivered to the controllable light source using a phase-control dimming technique.

The remote control device 120 may comprise a control circuit 130, which may include one or more of a processor (e.g., a microprocessor), a microcontroller, a programmable logic device (PLD), a field programmable gate array (FPGA), an application specific integrated circuit (ASIC), or any suitable processing device. The remote control device 120 may comprise a user interface having one or more control actuators 132 for receiving user inputs for controlling the controllable light source 110 and one or more visual indicators 134 for providing feedback to a user of the remote control device. The remote control device 120 may include a memory 136 communicatively coupled to the control circuit 130. The control circuit 130 may be configured to use the memory 136 for the storage and/or retrieval of, for example, a unique identifier (e.g., a serial number) of the remote control device 120. The memory 136 may be implemented as an external integrated circuit (IC) or as an internal circuit of the control circuit 130.

The remote control device 120 may further comprise a wireless communication circuit 138, for example, including an RF transmitter coupled to an antenna for transmitting the RF signals 106. The control circuit 130 may be coupled to the wireless communication circuit 138 for transmitting digital messages via the RF signals 106 in response to the actuations of the control actuators 132. The controllable light source 110 may turn on and off or adjust the intensity of the internal lighting load in response to the RF signals 106 transmitted by the remote control device 120 when one of the control actuators 132 is actuated. Alternatively, the wireless communication circuit 138 may include an RF receiver for receiving RF signals, an RF transceiver for transmitting and receiving RF signals, or an infrared (IR) transmitter and/or receiver for transmitting and/or receiving IR signals. For example, the control circuit 130 may be operable to receive a digital message including the intensity of lighting load of the controllable light source 110. Examples of antennas for wall-mounted control devices are described in greater detail in U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference.

The remote control device 130 may transmit RF signals 106 in response to actuations of one or more of the actuators 132. All digital messages transmitted by the remote control device 130 may include a command and identifying information, for example, the serial number that is stored in the memory 136. The remote control device 120 may be configured to transmit digital messages via the RF signals 106 to the controllable light source 110 according to a predefined RF communication protocol, such as, for example, one of LUTRON CLEAR CONNECT, WIFI, BLUETOOTH, ZIGBEE, Z-WAVE, KNX-RF, and ENOCEAN RADIO protocols. Alternatively, the remote control device 120 could be configured to transmit the digital messages via a different wireless medium, such as, for example, infrared (IR) signals or sound (such as voice).

The remote control device 120 may be associated with the controllable light source 110 during a configuration procedure of the load control system 100, such that the controllable light source 110 is responsive to digital messages transmitted by the remote control device 120 via the RF signals 106. For example, the remote control device 120 may be associated with the controllable light source 110 by opening and closing the air-gap switch 122 to cycle power to the controllable light source and then, within a first time period after closing the air-gap switch, actuating and holding a button on the remote control device 120 for a second shorter time period (e.g., approximately ten seconds). In addition, the controllable light source 110 may be grouped with one or more other controllable light sources (or other electrical load devices, load control devices, or electrical loads). Other examples of configuration procedures for load control systems are described in greater detail in commonly-assigned U.S. Patent Application Publication No. 2008/0111491, published May 15, 2008, entitled RADIO-FREQUENCY LIGHTING CONTROL SYSTEM; U.S. Patent Application Publication No. 2013/0214609, published Aug. 22, 2013, entitled TWO-PART LOAD CONTROL SYSTEM MOUNTABLE TO A SINGLE ELECTRICAL WALLBOX; U.S. Patent Application Publication No. 2014/0265568, published Sep. 18, 2014, entitled COMMISSIONING LOAD CONTROL SYSTEMS; and U.S. Patent Application Publication No. 2014/0117871, published May 1, 2014, entitled BATTERY-POWERED RETROFIT REMOTE CONTROL DEVICE; the entire disclosures of which are hereby incorporated by reference.

The remote control device 120 may also include a power supply 139 coupled in series with the air-gap switch 122 between the AC power source 102 and the controllable light source 110. When the air-gap switch 122 is closed, the power supply 139 is operable to conduct a charging current through the controllable light source 110 to generate a DC supply voltage $V_{CC}$ for powering the control circuit 130, the memory 136, the wireless communication circuit 138, and other low-voltage circuitry of the remote control device 120. The power supply 139 may be able to generate the DC supply voltage $V_{CC}$ without significantly distorting the load voltage developed across the controllable light source 110, e.g., as described in commonly-assigned U.S. Pat. No. 7,423,413, issued Sep. 9, 2008, entitled POWER SUPPLY FOR A LOAD CONTROL DEVICE, and U.S. Patent Application Publication No. 2010/0270982, published Oct. 28, 2010, entitled SMART ELECTRONIC SWITCH FOR LOW-POWER LOADS, the entire disclosure of which is hereby incorporated by reference. Since the remote control device 120 has the power supply 139, the remote control device does not require a depletable power source, such as one more batteries, which may need to be periodically replaced.

The air-gap switch 122 of the remote control device 120 could alternatively comprise a relay adapted to be controlled by the control circuit 130, such that the control circuit is able to open and close the relay in response to actuations of the control actuators 132 or the wireless signals received via the wireless communication circuit 138. In addition, the remote control device 120 could alternatively not comprise the air-gap switch 122 or the air-gap switch actuator 124.

The load control system 100 may further comprise an input device 140, e.g., an RF transmitter, such as a handheld battery-powered remote control, an occupancy sensor, a vacancy sensor, or a daylight sensor. The remote control device 120 may be configured to receive digital messages via RF signals 106 transmitted by the input device 140 and, in response to the received digital messages, to transmit digital messages to the controllable light source 110 via the RF signals 106 for controlling the controllable light source to turn the controllable light source on and off, and to increase or decrease the intensity of the controllable light source. In addition, the input device 140 may be configured to transmit the digital messages via the RF signals 106 directly to the controllable light source 110. The load control system 100 may comprise a plurality of input devices, a single input device, or no input devices.

A handheld battery-powered remote control may comprise one or more actuators (e.g., buttons) for receiving user inputs for controlling the controllable light source 110. Examples of battery-powered remote controls are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2014/0268628, published Sep. 18, 2014, entitled REMOTE CONTROL HAVING A CAPACITIVE TOUCH SURFACE AND A MECHANISM FOR AWAKENING THE REMOTE CONTROL, the entire disclosures of which are hereby incorporated by reference.

Occupancy sensors and vacancy sensors may detect occupancy and/or vacancy conditions in the space in which the load control system 100 is installed. The occupancy sensor and/or the vacancy sensor may transmit digital messages to the remote control device 120 via the RF signals 106 in response to detecting the occupancy and/or vacancy conditions. The remote control device 120 may be configured transmit digital messages to the controllable light source 110 to turn on the controllable light source in response to receiving an occupied command from an occupancy sensor, and to turn off the controllable light source in response to receiving a vacant command from the occupancy sensor. Alternatively, the remote control device 120 may be configured to only turn off the controllable light source 110 in response to a vacancy sensor detecting a vacancy condition (e.g., to not turn on the controllable light source in response to the vacancy sensor detecting an occupancy condition). Examples of RF load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

A daylight sensor may be configured to measure a total light intensity in the space in which the load control system is installed. The daylight sensor may transmit digital messages including the measured light intensity to the remote control device 120 via the RF signals 106 for controlling the intensities of the controllable light source 110 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

Alternatively, the controllable light source 110 and the remote control device 120 could be part of a larger RF load control system. Examples of RF load control systems are described in commonly-assigned U.S. Pat. No. 5,905,442, issued on May 18, 1999, entitled METHOD AND APPARATUS FOR CONTROLLING AND DETERMINING THE STATUS OF ELECTRICAL DEVICES FROM REMOTE LOCATIONS, and U.S. patent application Ser. No. 12/033,223, filed Feb. 19, 2008, entitled COMMUNI- CATION PROTOCOL FOR A RADIO-FREQUENCY LOAD CONTROL SYSTEM, the entire disclosures of which are both hereby incorporated by reference.

In addition, the load control system 100 could include other types of input devices, such as, for example, radiometers, cloudy-day sensors, shadow sensors, window sensors, temperature sensors, humidity sensors, pressure sensors, smoke detectors, carbon monoxide detectors, air-quality sensors, motion sensors, security sensors, proximity sensors, fixture sensors, partition sensors, keypads, kinetic or solar-powered remote controls, key fobs, cell phones, smart phones, tablets, personal digital assistants, personal computers, laptops, timeclocks, audio-visual controls, safety devices (such as fire protection, water protection, and medical emergency devices), power monitoring devices (such as power meters, energy meters, utility submeters, utility rate meters), residential, commercial, or industrial controllers, or any combination of these input devices. The input devices may comprise a central control transmitter (e.g., a system controller or broadcasting device) to allow for central control of the load control system 100. Specifically, the central control transmitter may be adapted to transmit a digital message including one of: a timeclock command, a load shed command, a demand response command, a peak demand command, or time-of-day pricing information. In addition, the remote control device 120 could be operable to transmit information, such as the status and energy consumption of the controlled loads, back to the central control transmitter or one of the other input devices. One or more of the different types of input devices may be provided in a single load control system.

FIG. 2A is a perspective view of an example remote control device 200, which may be deployed, for example, as the remote control device 120 of the load control system 100 as depicted in FIG. 1. The remote control device 200 may be configured to control an electrical load device (e.g., the controllable light source 110 of the load control system 100 of FIG. 1). The remote control device 200 may comprise a faceplate 210 that may be connected to an adapter plate 212. The faceplate 210 may comprise an opening 214 through which a bezel portion 215 of the remote control device 200 extends. FIG. 2B is a perspective view of the remote control device 200 with the faceplate 210 and the adapter plate 212 removed. The remote control device 200 may comprise a yoke 216 for mounting the remote control device 200 to an electrical wallbox, such that the bezel portion 215 is displaced over the opening of the wallbox. The adapter plate 212 may be connected to the yoke 216, e.g., using screws (not shown), and the faceplate 210 may snap to the adapter plate, e.g., as described in commonly-assigned U.S. Pat. No. 4,835,343, issued May 30, 1989, entitled TWO-PIECE FACE PLATE FOR WALL BOX MOUNTED DEVICE, the entire disclosure of which is hereby incorporated by reference.

The remote control device 200 may also comprise an enclosure 218 (e.g., a low-profile enclosure) for housing electrical circuitry of the remote control device (e.g., the electrical circuitry of the remote control device 120 shown in FIG. 1). For example, the air-gap switch 122, the control circuit 130, the memory 136, and the wireless communication circuit 138 may be housed in the enclosure 218 (e.g., inside of the electrical wallbox to which the remote control device 200 is mounted. Alternatively, the control circuit 130, the memory 136, and the wireless communication circuit 138 may be housed inside of the bezel portion 215 (e.g., outside of or at least partially outside of the electrical wallbox), while the air-gap switch 122 may be housed inside the enclosure 218. Since the remote control device 200 does not comprise a bidirectional semiconductor switch for controlling the amount of power delivered to the controllable light source 110 using a phase-control dimming technique, the enclosure 218 may be of smaller size that the enclosure of a standard dimmer switch (e.g., the enclosure is characterized by a low profile), and thus may be easier to install in an electrical wallbox. For example, the enclosure 218 may have a depth from the yoke 216 to a rear surface of the enclosure or approximately 0.75" or less (where the depth of an enclosure of a standard dimmer switch may be approximately 1.25").

As shown in FIGS. 2A and 2B, the remote control device 200 may comprise a user interface having a plurality of buttons (e.g., the control actuators 132 of the remote control 120 of the load control system 100 of FIG. 1) that are provided in the bezel portion 215 (e.g., arranged in front of the opening of the wallbox in which the remote control device 200 is installed). Specifically, the remote control device 200 may comprise, for example, an on button 220, an off button 222, a raise button 224, and a lower button 226. For example, the remote control device 200 may be associated with the controllable light source 110 and may transmit digital messages via wireless signals (e.g., the RF signals 106) for controlling the lighting load of the controllable light source in response to actuations of the buttons 220-226. For example, the remote control device 200 may transmit commands to turn the lighting load on and off in response to actuations of the on button 220 and the off button 222, respectively. In addition, the remote control device 200 may transmit commands to raise and lower the intensity of the lighting load in response to actuations of the raise button 224 and the lower button 226, respectively. Further, the remote control device 200 may additionally comprise a preset button (not shown) for selecting a lighting preset of the controllable light source 110. An example of the structure of wall-mounted control device is described in greater detail in commonly-assigned U.S. patent application Ser. No. 13/780,514, filed Feb. 28, 2013, entitled WIRELESS LOAD CONTROL DEVICE, the entire disclosure of which is hereby incorporated by reference.

The user interface of the remote control device 200 may further comprise a visual display, e.g., a linear array of visual indicators 228, that may be illuminated to provide feedback to a user (e.g., of the intensity of the controllable light source). The indicators 228 may be illuminated by a plurality of light-emitting diodes (LEDs) located in the enclosure 218.

The remote control device 200 may also comprise an air-gap switch actuator 230 for opening and closing an internal air-gap switch (e.g., the air-gap switch 124 of the remote control device 120 of FIG. 1), which may be housed in the enclosure 218 and may be coupled in series between an AC power source (e.g., the AC power source 102) and the electrical load. The air-gap switch actuator 230 may be located in the bezel portion 215 and may be mechanically coupled to the air-gap switch. For example, the air-gap switch may be opened to disconnect the electrical load from the AC power source in response to pulling the air-gap switch actuator 230 away from the bezel portion 215. An example of an air-gap switch actuator that may be pulled out from a control device is described in greater detail in commonly-assigned U.S. Pat. No. 7,365,282, issued Apr. 29, 2008, entitled PULL OUT AIR GAP SWITCH FOR A WALLBOX-MOUNTED DIMMER, the entire disclosure of which is hereby incorporated by reference.

Alternatively, the remote control device 200 could comprise a different air-gap switch actuator that pulls out from the remote control device in a different direction, for example, from the top, bottom, left, or right sides of the adapter plate. In addition, the remote control device 200 could comprise an air-gap switch actuator that slides sideways across the bezel portion 215 to actuate the internal air-gap switch. Further, the air-gap switch actuator could be hidden from view behind the faceplate 210, such that the air-gap switch actuator can only be actuated when the faceplate is removed.

Figure 3:
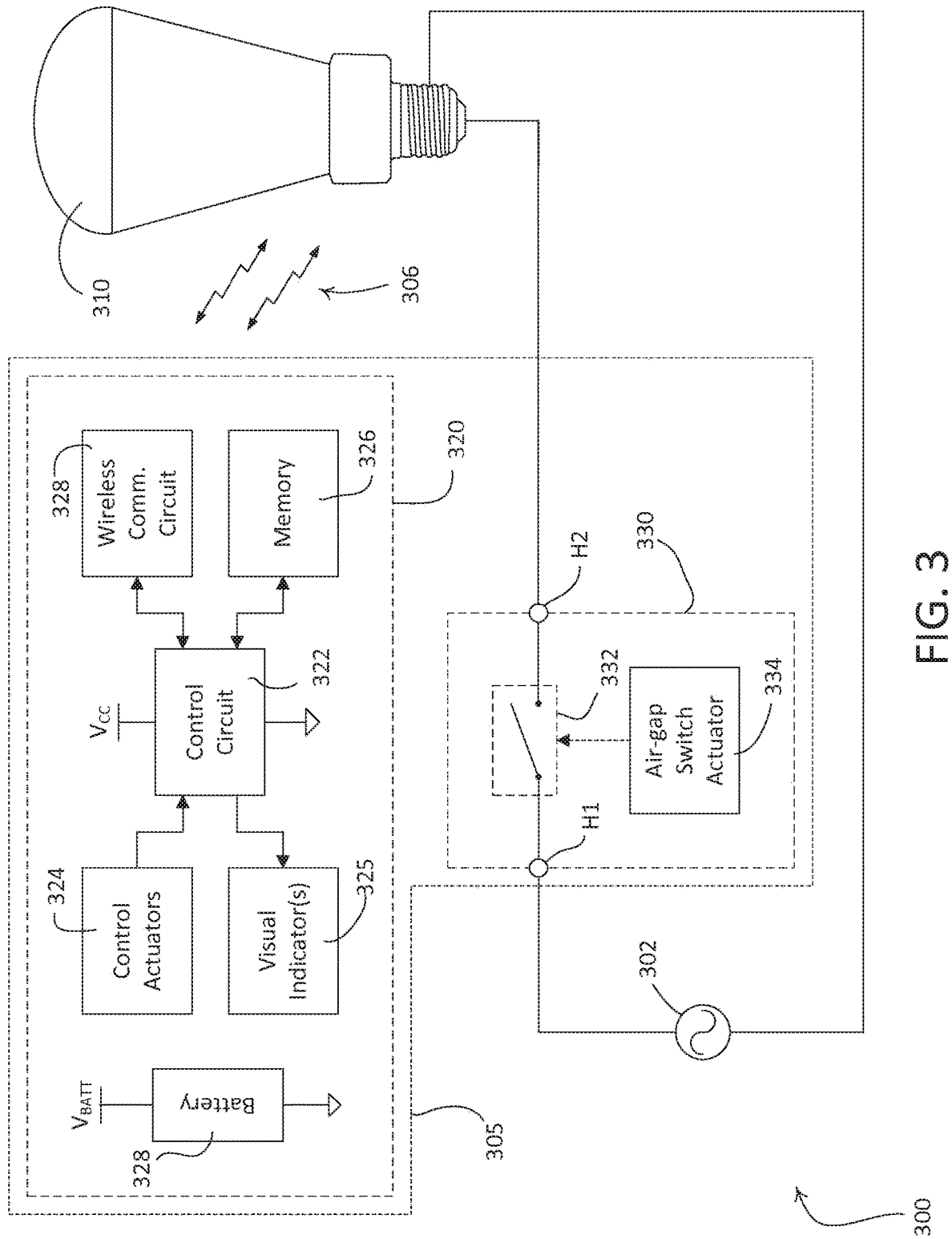
FIG. 3 is a simple diagram of an example load control system having a load control device and a two-part remote control device including a wireless communication device and an air-gap switch device.

FIG. 3 is a simple diagram of another example load control system 300 (e.g., a lighting control system) having a load control device (e.g., a controllable light source 310) and a two-part remote control device 305 that comprises a battery-powered wireless communication device 320 and an air-gap switch device 330. The controllable light source 310 may be similar to the controllable light source 110 of the load control system 100 shown in FIG. 1 and may be installed to replace a previously-installed light bulb. The air-gap switch device 330 may be adapted to be coupled in series electrical connection between an AC power source 302 and the controllable light source 310, e.g., mounted in an electrical wallbox in place of a previously-installed standard wall-mounted mechanical switch. The wireless communication device 320 may be mounted to the air-gap switch device 330, e.g., in front of the electrical wallbox in which the air-gap switch device is installed. The wireless communication device 320 may be configured to transmit wireless signals, e.g., RF signals 306, to the controllable light source 310 for controlling the controllable light source. The wireless communication device 320 may be assigned to the controllable light source 310 during a configuration procedure of the load control system 300, such that the controllable light source 310 is responsive to digital messages transmitted by the wireless communication device 320 via the RF signals 306.

The air-gap switch device 330 may comprise two load terminals H1, H2 for coupling the air-gap switch device 330 is series electrical connection between the AC power source 302 and the controllable light source 310. The air-gap switch device 330 may comprise a mechanical air-gap switch 332 that may be coupled in series between the load terminals H1, H2, and may be opened and closed in response to actuations of an air-gap switch actuator 334 for respectively disconnecting the controllable light source 310 from the AC power source 302. The air-gap switch device 330 does not include a bidirectional semiconductor switch (such as a triac or one or more field-effect transistors) for controlling the amount of power delivered to the controllable light source 310 using a phase-control dimming technique (e.g., as in a standard dimmer switch).

The wireless communication device 320 may comprise a control circuit 322, which may include one or more of a processor (e.g., a microprocessor), a microcontroller, a programmable logic device (PLD), a field programmable gate array (FPGA), an application specific integrated circuit (ASIC), or any suitable processing device. The wireless communication device 320 may comprise a user interface having one or more control actuators 324 for receiving user inputs for controlling the controllable light source 310, and one or more visual indicators 325 for providing feedback to a user of the wireless communication device. The wireless communication device 320 may include a memory 326 communicatively coupled to the control circuit 130 for the storage and/or retrieval of, for example, a unique identifier (e.g., a serial numbers) of the wireless communication device. The memory 326 may be implemented as an external integrated circuit (IC) or as an internal circuit of the control circuit 322.

The wireless communication device 320 may further comprise a wireless communication circuit 328, for example, including an RF transmitter coupled to an antenna for transmitting the RF signals 306 in response to the actuations of the control actuators 324. The controllable light source 310 may turn on and off or adjust the intensity of the internal lighting load in response to the RF signals 306 transmitted by the wireless communication device 320 when one of the control actuators 324 is actuated. Alternatively, the wireless communication circuit 328 may include an RF receiver for receiving RF signals, an RF transceiver for transmitting and receiving RF signals, or an IR transmitter and/or receiver for transmitting and/or receiving IR signals. For example, the control circuit 322 may be operable to receive a digital message including the intensity of lighting load of the controllable light source 310. While not shown in FIG. 3, the load control system 300 may comprise one or more input devices (e.g., similar to the input device 140 of the load control system 100 of FIG. 1), such as a handheld battery-powered remote control, an occupancy sensor, a vacancy sensor, or a daylight sensor.

The wireless communication device 320 may include a power source, e.g., a battery 329 producing a battery voltage $V_{BATT}$ (e.g., approximately 3 volts) for powering the control circuit 322, the memory 326, the wireless communication circuit 328, and other low-voltage circuitry of the wireless communication device.

Figure 4A:
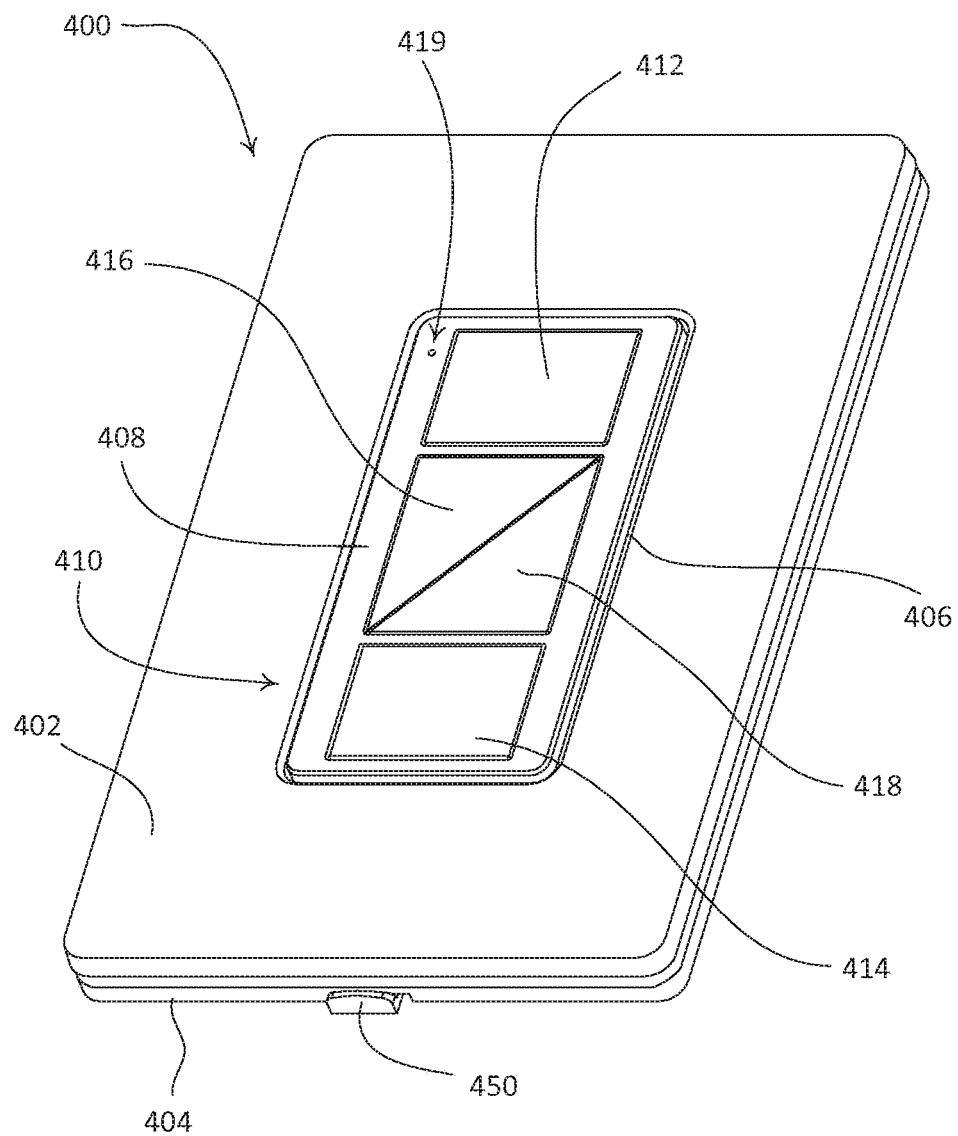
FIG. 4A is a perspective view of an example remote control device.

FIG. 4A is a perspective view of an example remote control device 400, which may be deployed, for example, as the remote control device 305 of the load control system 300 as depicted in FIG. 3. The remote control device 400 may comprise a faceplate 402 that may be connected to an adapter plate 404 and has an opening 406. The remote control device 400 may comprise a wireless communication device 410 (e.g., similar to the wireless communication device 320 of FIG. 3), which comprises a removable housing 408 (e.g., an enclosure or a handheld housing) that extends through the opening 406 of the faceplate 402. The wireless communication device 410 may comprise a user interface having a plurality of buttons (e.g., the control actuators 324 of the wireless communication device 320 of the load control system 300 of FIG. 3) that may be provided in the housing 408. Specifically, the user interface of the wireless communication device 410 may comprise, for example, an on button 412, an off button 414, a raise button 416, and a lower button 418.

The wireless communication device 410 of the remote control device 400 may be associated with an electrical load device (e.g., the controllable light source 310 of the load control system 300 of FIG. 3) and may transmit digital messages via wireless signals (e.g., the RF signals 306) for controlling the electrical load device (e.g., the lighting load of the controllable light source) in response to actuations of the buttons 412-418. For example, the wireless communication device 410 may transmit commands to turn the lighting load on and off in response to actuations of the on button 412 and the off button 414, respectively. In addition, the wireless communication device 410 may transmit commands to raise and lower the intensity of the lighting load in response to actuations of the raise button 416 and the lower button 418, respectively. The user interface of the wireless communication device 410 may also comprise a visual indicator 419 for providing feedback to a user of the remote control device, for example, when one of the buttons 412-

418 is being actuated and the remote control device is transmitting the wireless signals. Examples of remote control devices and wireless communication devices having a plurality of buttons are described in greater detail in commonly-assigned U.S. Patent Application Publication No. 2012/0286940, published Nov. 12, 2012, entitled CONTROL DEVICE HAVING A NIGHTLIGHT, the entire disclosure of which is hereby incorporated by reference.

Figure 4B:
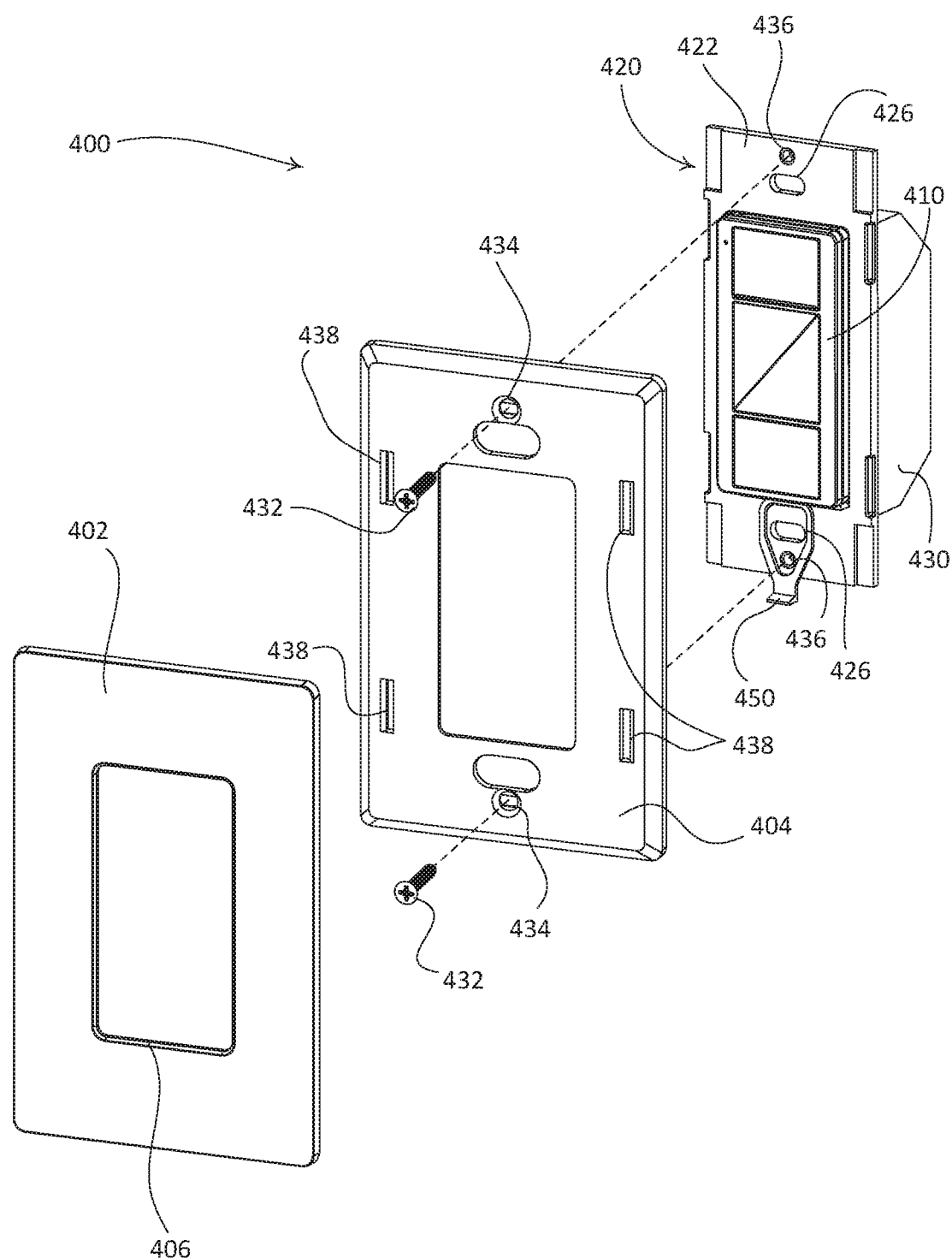
FIG. 4B is a partial exploded perspective view of the remote control device of FIG. 4B with a faceplate removed.
Figure 4C:
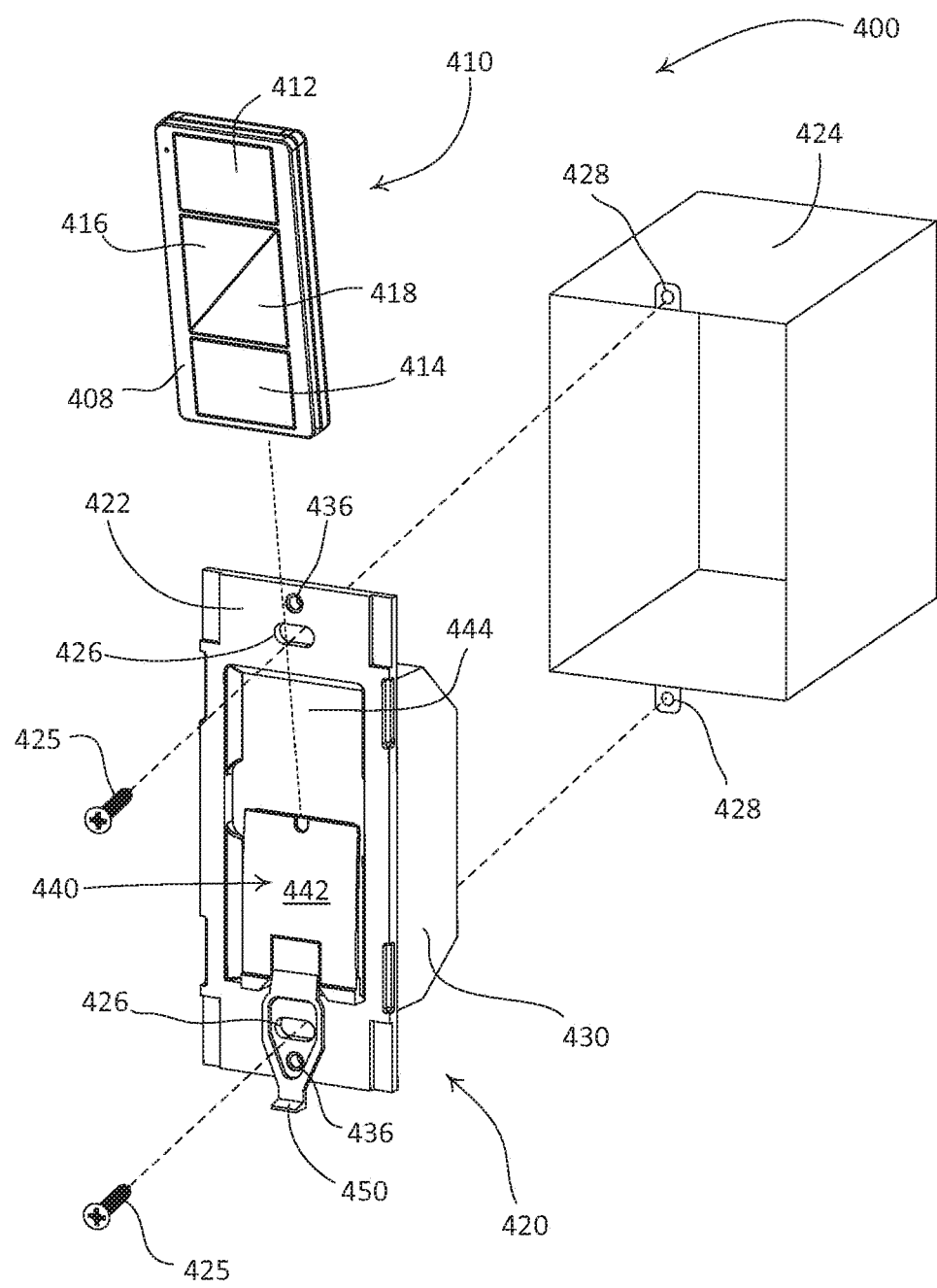
FIG. 4C is a perspective view showing how the remote control device of FIG. 4A may mount to an air-gap switch device.

FIG. 4B is a partial exploded perspective view of the remote control device 400 with the faceplate 402 and the adapter plate 404 removed. FIG. 4C is a perspective view showing how the wireless communication device 410 may mount to an air-gap switch device 420 (e.g., the air-gap switch device 330 of the load control system 300 of FIG. 3). The air-gap switch device 420 may comprise a yoke portion 422 for mounting the air-gap switch device to an electrical wallbox 424, such that the buttons 412-418 on the remote control device 400 may be displaced over the opening of the wallbox 424. For example, mounting screws 425 may be received through mounting openings 426 in the yoke portion 422 and corresponding mounting openings 428 in the wallbox 424.

The air-gap switch device 420 may comprise an enclosure 430 (e.g., a low-profile enclosure) for housing an internal air-gap switch (e.g., the air-gap switch 332 of the air-gap switch device 330 shown in FIG. 3), which may be electrically coupled in series between a power source and an electrical load device (e.g., the controllable light source 310 of FIG. 3). The adapter plate 404 may be connected to the yoke portion 422, e.g., using faceplate screws 432 received through openings 434 in the adapter plate 404 and corresponding openings 436 in the yoke portion. The adaptor plate 404 may include snap fastener recesses 438, which may receive projections (not shown) formed on the rear of the faceplate 402. Since the air-gap switch device 420 does not comprise a bidirectional semiconductor switch for controlling the amount of power delivered to the controllable light source 310 using a phase-control dimming technique, the enclosure 430 may be of smaller size that the enclosure of a standard dimmer switch (e.g., the enclosure is characterized by a low profile), and thus may be easier to install in an electrical wallbox. For example, the enclosure 430 may have a depth from the yoke portion 422 to a rear surface of the enclosure or approximately 0.75" or less (where the depth of an enclosure of a standard dimmer switch may be approximately 1.25").

The yoke portion 422 of the air-gap switch device 420 may define a mounting structure 440 that may be configured to releasably receive the housing 408. The mounting structure 440 may comprise a flexible integrally-formed leaf 442 positioned in a recess 444. The housing 408 of the wireless communication device 410 may comprise a slide-receiving portion (not shown) in which the leaf 442 is received (e.g., slidably fastenable) as shown in FIG. 4C, as described in greater detail in commonly-assigned U.S. Pat. No. 8,389, 857, issued Mar. 5, 2013, entitled STRUCTURE FOR MOUNTING A WIRELESS BATTERY-POWERED REMOTE CONTROL, the entire disclosure of which is hereby incorporated by reference. Accordingly, the buttons 412-418 of the wireless communication device 410 may be located in front of the opening of the wallbox 424 when the remote control device is installed on the air-gap switch device 420 and the air-gap switch device is mounted to the wallbox.

Since the wireless communication device 410 is battery-powered, the housing 408 (i.e., the handheld housing) may be removed from the mounting structure 440 while the air-gap switch of the air-gap switch device 420 is closed and the electrical load device is powered. For example, the wireless communication device 410 may be removed from the mounting structure 440 and may be used as a handheld remote control for the electrical load device (e.g., to transmit RF signals to the electrical load device in response to actuations of the buttons 412-418 while the wireless communication device is removed from the mounting structure). Alternatively, the air-gap switch device 420 could comprise a theft deterrent mechanism (such as a screw) for locking the wireless communication device 410 in place when the wireless communication device 410 is mounted to the mounting structure 440 to hinder theft if the remote control device 400 is installed in a public space, such as an office or a hotel room.

While the wireless communication device 410 shown in FIGS. 4A and 4B comprises five buttons 412-418, the wireless communication device 410 could comprise any number, type, combination, arrangement, or orientation of actuators. To provide for easy adjustment of the user interface of the remote control device 400, the wireless communication device 410 may be removed from the mounting structure 440 and replaced with a new wireless communication device having a different number, type, combination, arrangement, or orientation of actuators. For example, the wireless communication device 410 could comprise one or more buttons, toggle switches, paddle switches, rockers, sliders, rotary knobs, or other actuators that allow for controlling electrical load devices, load control devices, and/or electrical loads.

The air-gap switch device 420 may also comprise an air-gap switch actuator 450 mechanically coupled to the internal air-gap switch housed in the enclosure 430 for opening and closing the air-gap switch. The air-gap switch actuator 450 may be actuated to cycle power to the electrical load device to facilitate association of the wireless communication device 410 and the electrical load device. While the wireless communication device 410 is detached from the mounting structure 440, the air-gap switch actuator 450 may be actuated to turn the electrical load device on and off from the air-gap switch device 420.

The air-gap switch actuator 450 may protrude past a lower edge of the faceplate 402 and/or the adapter plate 404, such that the air-gap switch actuator may be actuated when the faceplate is installed on the air-gap switch device 420. The air-gap switch may be opened to disconnect the electrical load device from the AC power source in response to pulling the air-gap switch actuator 450 down from the air-gap switch device 420, e.g., as shown and described in commonly-assigned U.S. Pat. No. 4,783,581, issued Nov. 8, 1988, entitled AIR GAP SWITCH ASSEMBLY, and U.S. Pat. No. 8,173,920, issued May 8, 2012, entitled LOAD CONTROL DEVICE HAVING A MODULAR ASSEMBLY, the entire disclosure of which is hereby incorporated by reference.

Alternatively, the air-gap switch actuator could be hidden from view behind the faceplate 402, such that the air-gap switch actuator can only be actuated when the faceplate is removed. In addition, the air-gap switch device 420 could alternatively comprise a blank bezel portion having no actuators positioned in the opening 406 of the faceplate 402 rather than the remote control device 400, and could comprise only the air-gap switch actuator 450 for allowing the user to disconnect the electrical load from the AC power source.

Figure 5:
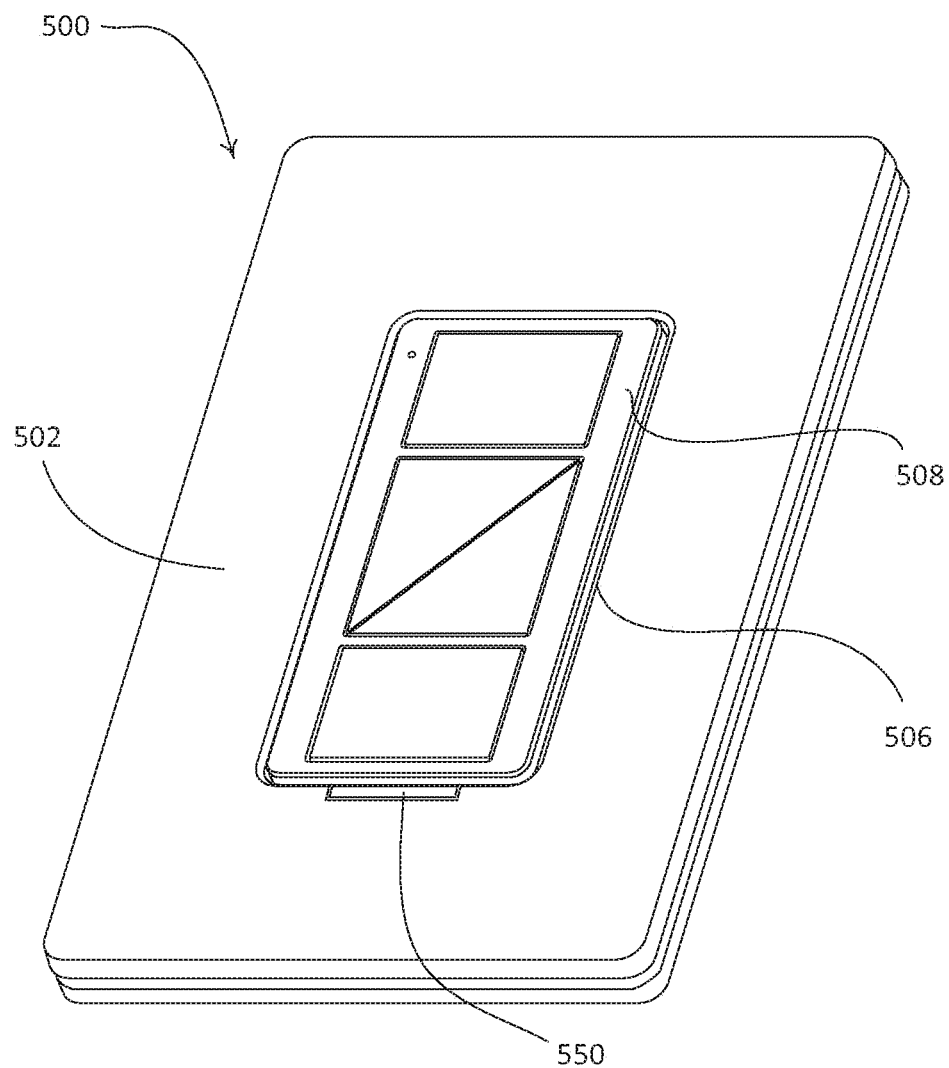
FIG. 5 is a perspective view of an example remote control device.

The remote control device 400 could alternatively comprise an air-gap switch actuator that pulls out from the remote control device, for example, in a similar manner as the air-gap switch actuator 230 is pulled out away from the remote control device 200 shown in FIGS. 2A and 2B. FIG. 5 is a perspective view of an example remote control device 500 having an air-gap switch actuator 550 that pulls out from the remote control device. The air-gap switch actuator 550 may be coupled to an air-gap switch (not shown) in an air-gap switch device (not shown) to which the remote control device 500 is mounted (e.g., in a similar fashion as the remote control device 400 mounts to the air-gap switch device 420). For example, the air-gap switch actuator 550 may be positioned in the front surface of a faceplate 502 below an opening 506 of the faceplate (e.g., below a housing 508 of the remote control device 500). In addition, the remote control device 500 could comprise an air-gap switch actuator that slides sideways through a recess below the opening 506 of the faceplate 502 to actuate the internal air-gap switch.

Figure 6:
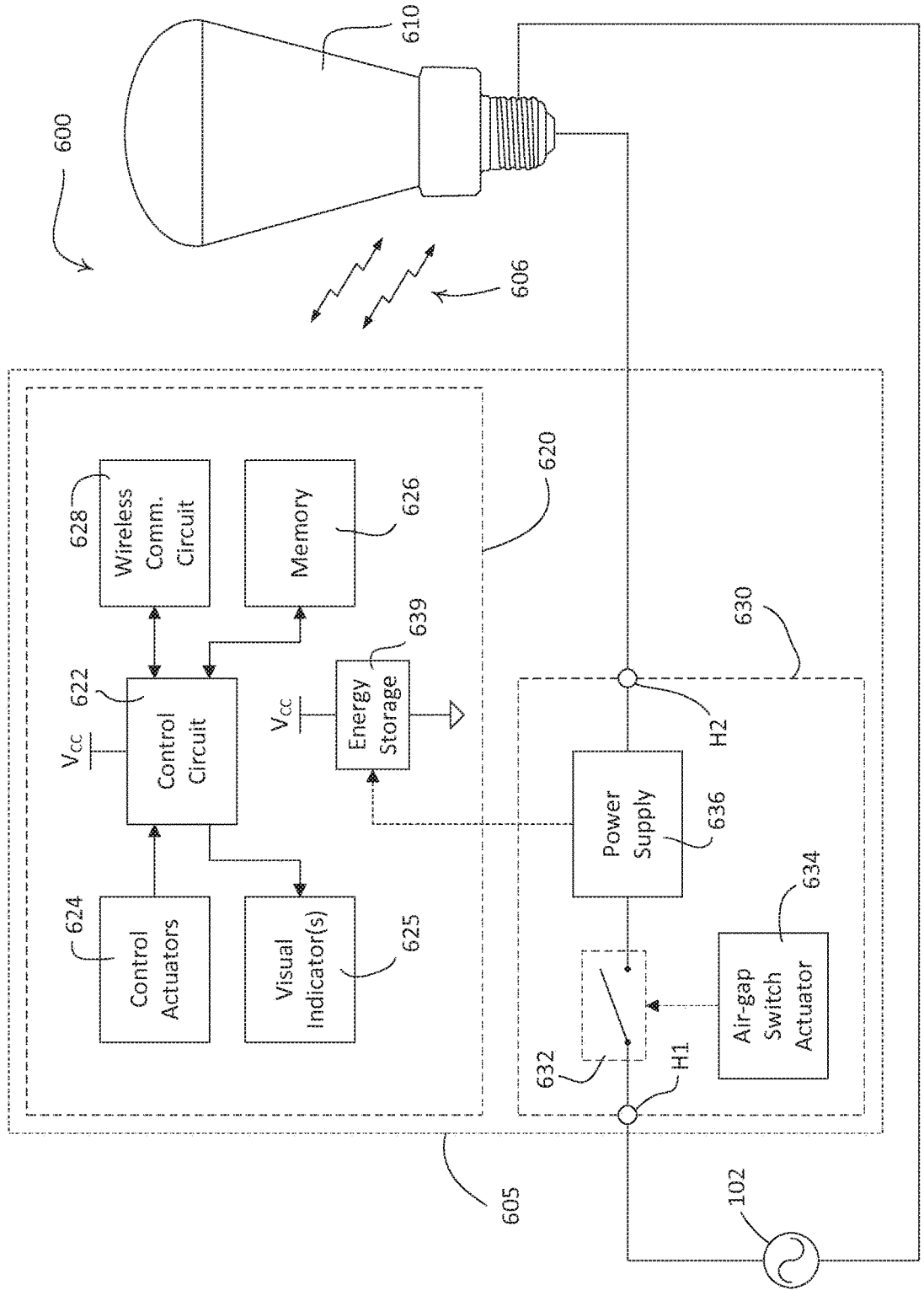
FIG. 6 is a simple diagram of another example load control system having a load control device and a two-part remote control device including a wireless communication device and an air-gap switch device.

FIG. 6 is a simple diagram of another example load control system 600 (e.g., a lighting control system) having a load control device (e.g., a controllable light source 610) and a remote control device 605 that comprises a wireless communication device 620 and an air-gap switch device 630. The controllable light source 610 may be similar to the controllable light source 110 of the load control system 100 shown in FIG. 1 and may be installed to replace a previously-installed light bulb. The air-gap switch device 630 may be adapted to be mounted in an electrical wallbox in place of a previously-installed standard wall-mounted mechanical switch and to be coupled in series electrical connection between an AC power source 602 and the controllable light source 610. The wireless communication device 620 may be configured to transmit wireless signals, e.g., RF signals 606, to the controllable light source 610 for controlling the controllable light source. The wireless communication device 620 may be assigned to the controllable light source 610 during a configuration procedure of the load control system 600, such that the controllable light source 610 is responsive to digital messages transmitted by the wireless communication device 620 via the RF signals 606.

The wireless communication device 620 may be mounted to the air-gap switch device 630, e.g., in front of the electrical wallbox in which the air-gap switch device is installed (e.g., in a similar manner as the wireless communication device 320 mounts to the air-gap switch device 330 as shown in FIGS. 4A and 4B). To provide for easy adjustment of the user interface of the remote control device 605, the wireless communication device 620 may be unmounted from the air-gap switch device 630 and replaced with a new wireless communication device having a different number or type of buttons.

The air-gap switch device 630 may comprise two load terminals H1, H2 for coupling the air-gap switch device is series electrical connection between the AC power source 302 and the controllable light source 610. The air-gap switch device 630 may comprise a mechanical air-gap switch 632 that may be coupled in series between the load terminals H1, H2, and may be opened and closed in response to actuations of an air-gap switch actuator 634 for respectively disconnecting the controllable light source 610 from the AC power source 602. The air-gap switch device 630 may also include a power supply 636 coupled in series with the air-gap switch 632 between the AC power source 602 and the controllable light source 610 for powering the wireless communication device 620 when the air-gap switch is closed as will be described in greater detail below.

The wireless communication device 620 may comprise a control circuit 622, which may include one or more of a processor (e.g., a microprocessor), a microcontroller, a programmable logic device (PLD), a field programmable gate array (FPGA), an application specific integrated circuit (ASIC), or any suitable processing device. The wireless communication device 620 may comprise a user interface having one or more control actuators 624 for receiving user inputs for controlling the controllable light source 610, and one or more visual indicators 625 for providing feedback to a user of the wireless communication device. The wireless communication device 620 may include a memory 626 communicatively coupled to the control circuit 620 for the storage and/or retrieval of, for example, a unique identifier (e.g., a serial numbers) of the wireless communication device. The memory 626 may be implemented as an external integrated circuit (IC) or as an internal circuit of the control circuit 622.

The wireless communication device 620 may further comprise a wireless communication circuit 628, for example, including an RF transmitter coupled to an antenna for transmitting the RF signals 606 in response to the actuations of the control actuators 624. The controllable light source 610 may turn on and off or adjust the intensity of the internal lighting load in response to the RF signals 606 transmitted by the wireless communication device 620 when one of the control actuators 624 is actuated. Alternatively, the wireless communication circuit 628 may include an RF receiver for receiving RF signals, an RF transceiver for transmitting and receiving RF signals, or an IR transmitter and/or receiver for transmitting and/or receiving IR signals. For example, the control circuit 622 may be operable to receive a digital message including the intensity of lighting load of the controllable light source 610. While not shown in FIG. 6, the load control system 600 may comprise one or more input devices (e.g., similar to the input device 140 of the load control system 100 of FIG. 1), such as a handheld battery-powered remote control, an occupancy sensor, a vacancy sensor, or a daylight sensor.

The wireless communication device 620 may also include an energy storage element 639, such as a capacitor or a rechargeable battery, which is able to be charged from the power supply 636 in the air-gap switch device 630. When the air-gap switch 632 is closed, the energy storage element 639 is operable to charge and to generate a DC supply voltage $V_{CC}$ for powering the control circuit 622, the memory 626, the wireless communication circuit 638, and other low-voltage circuitry of the wireless communication device 620. The power supply 636 may be able to conduct a charging current through the controllable light source 610 to generate the DC supply voltage $V_{CC}$ without significantly distorting the voltage supplied to the controllable light source 610 (e.g., in a similar manner as with the power supply 139 described above). If the energy storage element 639 of the wireless communication device 620 comprises a rechargeable battery, the battery may be able to charge from the power supply 636 in the air-gap switch device 630 while the wireless communication device is mounted to the air-gap switch device. Accordingly, the rechargeable battery may not substantially deplete in power and may not to be periodically replaced even if the wireless communication device 620 is occasionally unmounted from the air-gap switch device 630 for finite periods of time.

For example, the energy storage element 639 may be operable to derive power from an inductive coupling with the power supply 636 in the air-gap switch device 630, e.g., as described in commonly-assigned U.S. Patent Application Publication No. 2013/0214609, published Aug. 22, 2013, entitled TWO-PART LOAD CONTROL SYSTEM MOUNTABLE TO A SINGLE ELECTRICAL WALLBOX, the entire disclosure of which is hereby incorporated by reference. Alternatively, the energy storage element 639 could be adapted to be coupled to the power supply 636 in the air-gap switch device 630 via a wired connection. For example, the power supply 636 could be an isolated power supply and the air-gap switch device 630 could comprise pogo pins (not shown) adapted to contact electrical contacts on the wireless communication device 620.

The remote control devices 120, 200, 305, 400, 500, 605 could be to replace light switches in a three-way lighting system having two single-pole double-throw (SPDT) mechanical switches for controlling an electrical load device, e.g., a lighting load, such as an incandescent or dimmable light source. For example, a standard dimmer switch could be installed in place of the first SPDT mechanical switch in a first electrical wallbox and one of the remote control devices 120, 200, 305, 400, 500, 605 could be installed in place of the second SPDT mechanical switch in a second electrical wallbox. The dimmer switch and the remote control device could be electrically coupled in series between the AC power source and the lighting load. The dimmer switch could be configured to use a phase-control dimming technique to control the amount of power delivered to the lighting load. The remote control device could comprise one or more buttons and could be configured to transmit a digital message to the dimmer switch for controlling the lighting load in response to an actuation of one of the buttons. In addition, the remote control device could be configured to transmit a digital message another load control device (other than the dimmer switch) for controlling a different electrical load in response to an actuation of one of the buttons While the load control systems 100, 300, 600 were shown and described herein for control of the controllable light sources 110, 310, 610 (e.g., controllable screw-in lamps), the remote control devices 120, 200, 305, 400, 500, 605 could be used to control other types of electrical load devices, load control devices, and electrical loads, e.g., in other retrofit installations. For example, the remote control devices 120, 200, 305, 400, 500, 605 could be used to control, for example, remotely-mounted load control devices, that may be located on or above the ceiling, inside of a wall, or in an electrical closet. For example, the remotely-mounted load control devices may comprise an electronic dimming ballast for driving one or more fluorescent lamps in a ceiling-mounted lighting fixture and/or an LED driver for regulating the current through an LED light engine in a ceiling-mounted lighting fixture. For example, the electronic ballast or the LED driver may be mounted to a junction box adjacent to the lighting fixture in which the fluorescent lamps or the LED light engine is located. The electronic ballast and the LED driver may each comprise an internal RF receiver and antenna mounted on or extending from the respective enclosure.

In addition, the electronic ballast and the LED driver may each be electronically coupled to a control module, e.g., via an analog control link or a digital communication link. The control module may comprise a wireless communication circuit (e.g., an RF receiver or an RF transceiver) and may be mounted away from the electronic ballast and the LED driver, for example, on an external surface of the lighting fixture and/or the ceiling. Alternatively, the control module may be mounted above the ceiling, e.g., to the junction box to which the electronic ballast or the LED driver is mounted, inside of a wall, or in an electrical closet. The control module may be configured to control the electronic ballast and the LED driver in response to received RF signals.

The electronic ballast and the LED driver may be responsive to the RF signals transmitted by any of the input devices of the load control systems 100, 300, 600 (e.g., handheld battery-powered remote control, an occupancy sensor, a vacancy sensor, or a daylight sensor). For example, the electronic ballast and the LED driver may each turn the respective lighting load on and off and may each adjust the intensity of the respective lighting load in response to the received RF signals. Examples of electronic dimming ballasts and LED drivers are described in greater detail in commonly-assigned U.S. Pat. No. 8,492,987, issued Jul. 23, 2013, entitled LOAD CONTROL DEVICE FOR A LIGHT-EMITTING DIODE LIGHT SOURCE, and U.S. Pat. No. 8,629,624, issued Jan. 14, 2014, entitled METHOD AND APPARATUS FOR MEASURING OPERATING CHARACTERISTICS IN A LOAD CONTROL DEVICE, the entire disclosures of which are hereby incorporated by reference.

The load control systems 100, 300, 600 may also comprise motorized window treatments for controlling an amount of daylight entering a space. For example, the motorized window treatments may comprise a battery-powered motorized cellular shade and/or a battery-powered motorized roller shade. In addition, the load control systems 100, 300, 600 may comprise other types of motorized window treatments, such as, for example, draperies, Roman shades, Venetian blinds, Persian blinds, pleated blinds, and tensioned roller shade systems. The motorized window treatments may each comprise an internal wireless communication circuit (e.g., a RF receiver and an antenna mounted on or extending from a motor drive unit of the motorized window treatment). Alternatively, the motorized window treatments may each be electronically coupled to control module (e.g., having an RF receiver and/or an antenna) that is mounted away from the motorized window treatment.

The motorized window treatments may be responsive to the RF signals transmitted by the input devices of the load control systems 100, 300, 600 (e.g., handheld battery-powered remote control, an occupancy sensor, a vacancy sensor, or a daylight sensor). For example, the motorized window treatments may open and close a covering material to allow more or less daylight to enter the space in response to the received RF signals. Examples of battery-powered motorized window treatments are described in greater detail in commonly-assigned U.S. Patent Application Publication No. 2012/0261078, published Oct. 18, 2012, entitled MOTORIZED WINDOW TREATMENT, and U.S. Patent Application Publication No. 20140305602, published Oct. 16, 2014, entitled INTEGRATED ACCESSIBLE BATTERY COMPARTMENT FOR MOTORIZED WINDOW TREATMENT, the entire disclosures of which are hereby incorporated by reference.

The remote control devices 120, 200, 305, 400, 500, 605 could be used to control other types of electrical load devices, load control devices, and electrical loads, such as, for example, a dimming circuit for controlling the intensity of an incandescent lamp, a halogen lamp, an electronic low-voltage lighting load, a magnetic low-voltage lighting load, or another type of lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a controllable electrical receptacle, a plug-in load control device, or a controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

What is claimed is:

1. A switch device for controlling an amount of power delivered from an alternating-current (AC) power source to an electrical load device, the switch device comprising:
   an enclosure configured to be installed in an electrical wallbox;
   an air-gap switch located inside of the enclosure and configured to be electrically coupled in series between the AC power source and the electrical load device;
   an air-gap switch actuator mechanically coupled to the air-gap switch and configured to be actuated by a user to open and close the air-gap switch; and
   a mounting structure connected to the enclosure and configured to mount a wireless communication device to the enclosure in such a way that the wireless communication device is located at least partially outside of the electrical wallbox when the enclosure is installed in the electrical wallbox.

2. The switch device of claim 1, further comprising:
   a power supply electrically coupled in series with the air-gap switch and configured to conduct a charging current through the electrical load device to generate a direct-current (DC) supply voltage across an energy storage element of the wireless communication device.

3. The switch device of claim 2, wherein the power supply is configured to be electrically coupled to the energy storage element of the wireless communication device.

4. The switch device of claim 3, wherein the mounting structure comprises pogo pins adapted to contact electrical contacts on the wireless communication device to electrically coupled the power supply to the energy storage element.

5. The switch device of claim 2, wherein the power supply is configured to be inductively coupled to the energy storage element.

6. The switch device of claim 2, wherein the energy storage element comprises a capacitor or a battery.

7. The switch device of claim 2, wherein the power supply is configured to conduct the charging current through the electrical load device without significantly distorting a load voltage developed across the electrical load device.

8. The switch device of claim 1, further comprising a yoke portion, wherein:
   the yoke portion is connected to the enclosure,
   the yoke portion is configured to be mounted to the electrical wallbox such that the enclosure is located inside of the electrical wallbox, and
   the yoke portion defines the mounting structure.

9. The switch device of claim 8, wherein the mounting structure is configured such that the wireless communication device is removable from the mounting structure after the yoke portion is mounted to the electrical wallbox.

10. The switch device of claim 9, wherein the mounting structure further comprises an opening sized to receive the wireless communication device, and a leaf positioned in the opening configured to receive the wireless communication device in such a way that the wireless communication device is retained in position on the mounting structure and the wireless communication device is framed by the opening.

11. The switch device of claim 10, wherein the leaf is further configured to receive a flanged recess disposed on a rear surface of the wireless communication device.

12. The switch device of claim 8, wherein the yoke portion comprises openings configured to receive screws to mount a faceplate to the yoke portion.

13. The switch device of claim 12, wherein the air-gap switch actuator is further configured such that when the faceplate is mounted to the yoke portion, the air-gap switch actuator is located behind the faceplate and is hidden from view.

14. The switch device of claim 12, wherein the air-gap switch actuator is further configured such that when the faceplate is mounted to the yoke portion, the air-gap switch actuator protrudes past an edge of the faceplate such that the air-gap switch actuator is accessible to a user.

15. The switch device of claim 1, wherein the air-gap switch actuator is further configured to be pulled horizontally away from the switch device to open the air-gap switch.

16. The switch device of claim 1, wherein the air-gap switch actuator is further configured to slide horizontally to open the air-gap switch.

17. The switch device of claim 1, wherein the air-gap switch is further configured to provide an actual air-gap barrier between the AC power source and the electrical load device when the air-gap switch is open.

18. The switch device of claim 1, wherein the switch device further comprises a two-wire device.

* * * * *